US008648980B2

(12) United States Patent
Yada et al.

(10) Patent No.: US 8,648,980 B2
(45) Date of Patent: Feb. 11, 2014

(54) LIQUID CRYSTAL DISPLAY DEVICE

(75) Inventors: Haruyoshi Yada, Kawasaki (JP);
Miyuki Kazama, Kawasaki (JP);
Toshifumi Tanida, Kawasaki (JP);
Nariyasu Hayakawa, Kawasaki (JP);
Hiroshi Kobayashi, Kawasaki (JP);
Toshiyuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 13/373,400

(22) Filed: Nov. 14, 2011

(65) Prior Publication Data
US 2012/0057094 A1 Mar. 8, 2012

Related U.S. Application Data

(62) Division of application No. 12/230,997, filed on Sep. 9, 2008, now Pat. No. 8,081,269.

(30) Foreign Application Priority Data

Sep. 25, 2007 (JP) ................................ 2007-247322

(51) Int. Cl.
*G02F 1/1333* (2006.01)
(52) U.S. Cl.
USPC ............................................. 349/60; 349/58
(58) Field of Classification Search
USPC ...................................................... 349/60, 58
See application file for complete search history.

(56) References Cited

U.S. PATENT DOCUMENTS

| 5,273,475 | A | * | 12/1993 | Oshikawa ........................ 445/24 |
| 5,313,318 | A | * | 5/1994 | Gruenberg et al. ............. 349/65 |
| 5,659,376 | A | * | 8/1997 | Uehara et al. .................... 349/58 |
| 6,266,123 | B1 | * | 7/2001 | Maejima et al. ............... 349/160 |
| 7,599,018 | B2 | * | 10/2009 | Shen et al. ...................... 349/58 |
| 7,742,137 | B2 | | 6/2010 | Adachi et al. ................. 349/122 |
| 7,826,001 | B2 | * | 11/2010 | Tai et al. ......................... 349/58 |
| 2002/0149714 | A1 | * | 10/2002 | Anderson et al. ............... 349/59 |
| 2004/0062029 | A1 | | 4/2004 | Ato |
| 2004/0125267 | A1 | | 7/2004 | Noh |
| 2004/0141101 | A1 | * | 7/2004 | Osu et al. ......................... 349/58 |
| 2005/0033119 | A1 | * | 2/2005 | Okawa et al. .................. 600/249 |
| 2005/0234526 | A1 | * | 10/2005 | Gilhuly et al. .................. 607/86 |
| 2007/0046874 | A1 | | 3/2007 | Adachi et al. ................. 349/122 |

(Continued)

FOREIGN PATENT DOCUMENTS

| JP | 02235022 A | * | 9/1990 | ............ G02F 1/1335 |
| JP | 06095110 A | * | 4/1994 | ............ G02F 1/1335 |

(Continued)

OTHER PUBLICATIONS

Japanese Office Action issued Aug. 25, 2009 in corresponding Japanese Patent Application 2007-247322.

(Continued)

*Primary Examiner* — Kaveh Kianni
(74) *Attorney, Agent, or Firm* — Staas & Halsey LLP

(57) ABSTRACT

Provided is a liquid crystal display device including a liquid crystal display panel, a liquid crystal display protection panel set above the liquid crystal display panel so as to protect a display surface of the liquid crystal display panel, the liquid crystal display protection panel being warped with its central portion being protruded, and a frame supporting the liquid crystal display panel and the liquid crystal display protection panel.

5 Claims, 16 Drawing Sheets

(56) References Cited

U.S. PATENT DOCUMENTS

| | | | |
|---|---|---|---|
| 2007/0132906 A1* | 6/2007 | Shen et al. | 349/58 |
| 2008/0018824 A1* | 1/2008 | Sawa | 349/58 |
| 2009/0079904 A1* | 3/2009 | Yada et al. | 349/60 |
| 2010/0079395 A1* | 4/2010 | Kim et al. | 345/173 |

FOREIGN PATENT DOCUMENTS

| | | | |
|---|---|---|---|
| JP | 9-96800 | 4/1997 | |
| JP | 10114241 A * | 5/1998 | B60K 35/00 |
| JP | 2000-10097 | 1/2000 | |
| JP | 2000010083 A * | 1/2000 | G02F 1/1333 |
| JP | 2000010097 A * | 1/2000 | G02F 1/1335 |
| JP | 2004-46254 | 2/2004 | |
| JP | 2004-111153 | 4/2004 | |
| JP | 2004-212930 | 7/2004 | |

OTHER PUBLICATIONS

U.S. Appl. No. 12/230,997, filed Sep. 9, 2008, Haruyoshi Yada et al., Fujitsu Limited.

Restriction Requirement mailed from the United States Patent and Trademark Office on Oct. 8, 2010 in the related U.S. Appl. No. 12/230,997.

Office Action mailed from the United States Patent and Trademark Office on Feb. 7, 2011 in the related U.S. Appl. No. 12/230,997.

Notice of Allowance mailed from the United States Patent and Trademark Office on Aug. 15, 2011 in the related U.S. Appl. No. 12/230,997.

Office Action issued by the Japanese Patent Office on Nov. 8, 2011 in the related Japanese patent application No. 2009-243835.

Office Action issued by the Japanese Patent Office on Jul. 31, 2012 in the related Japanese patent application No. 2009-243835.

* cited by examiner

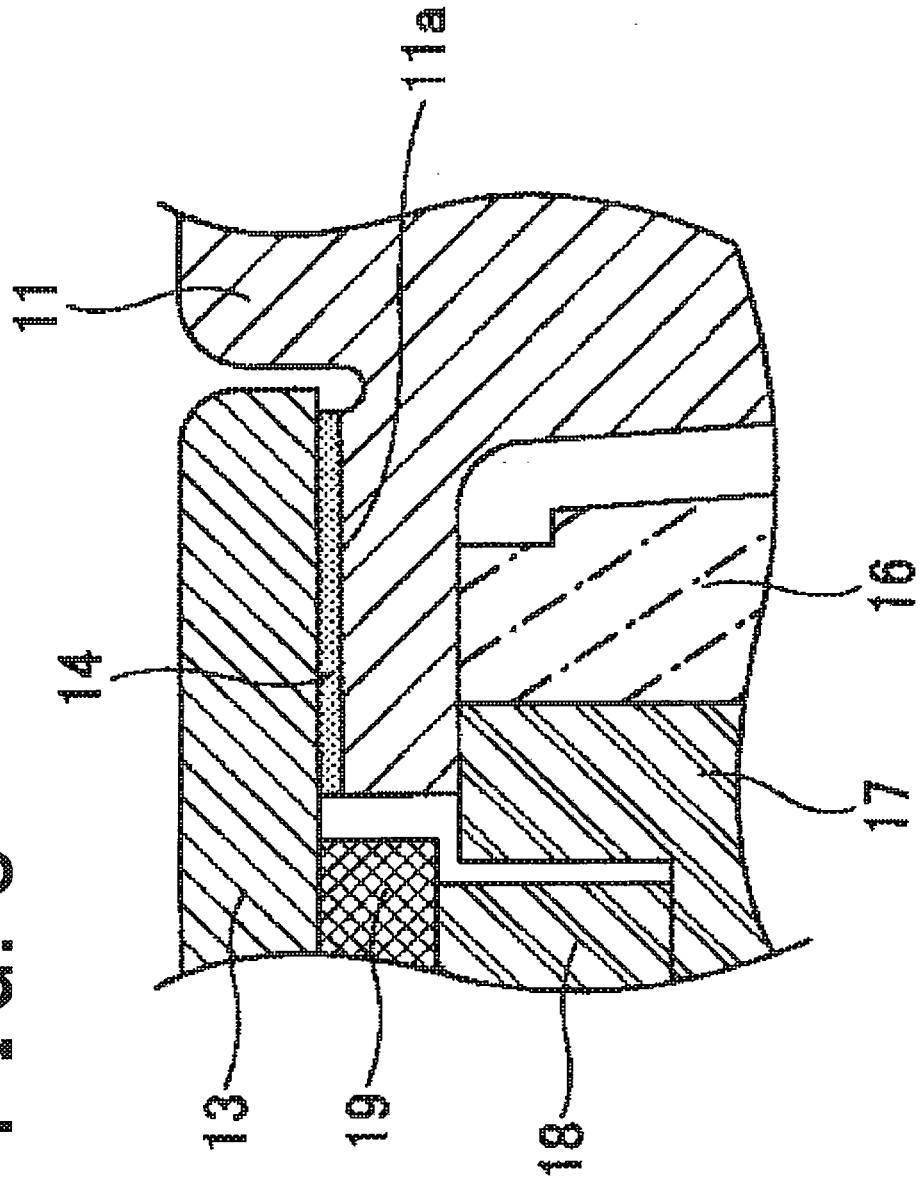

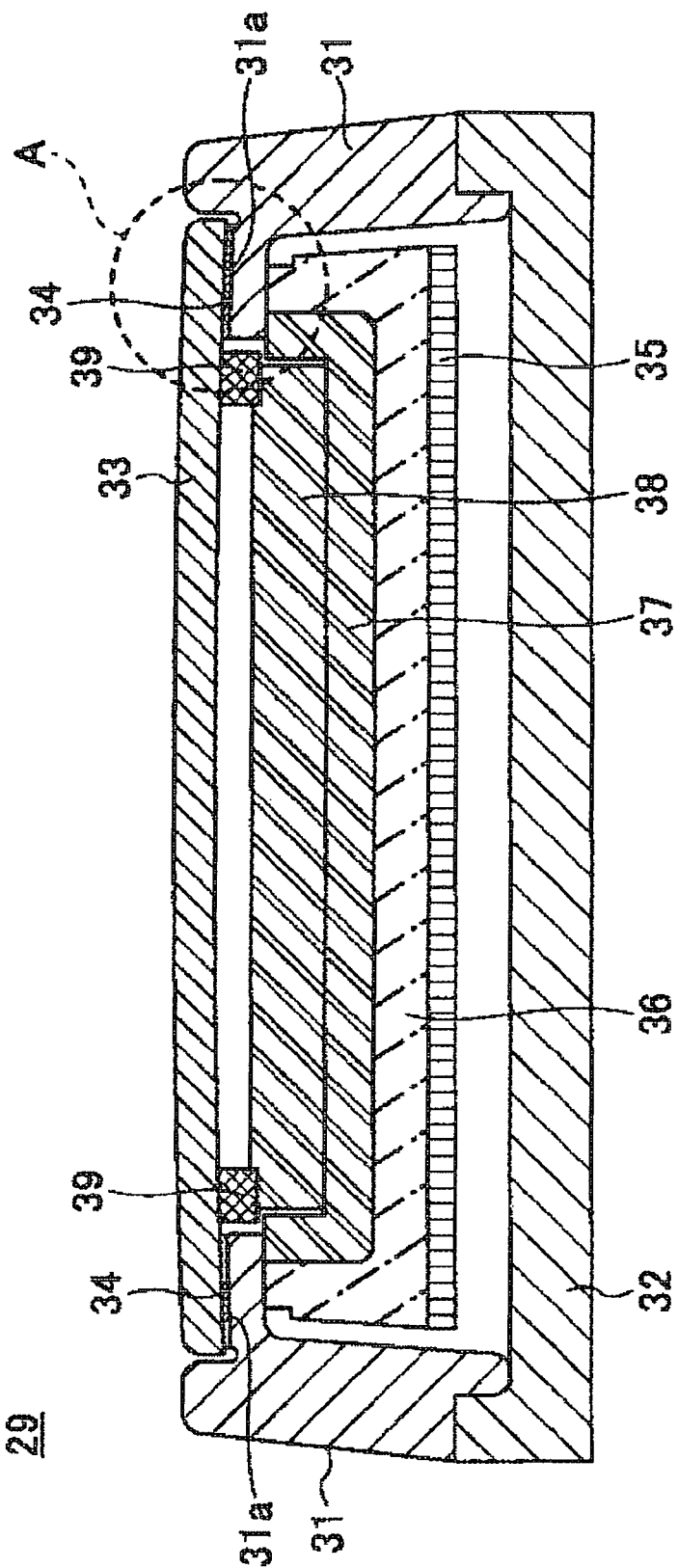

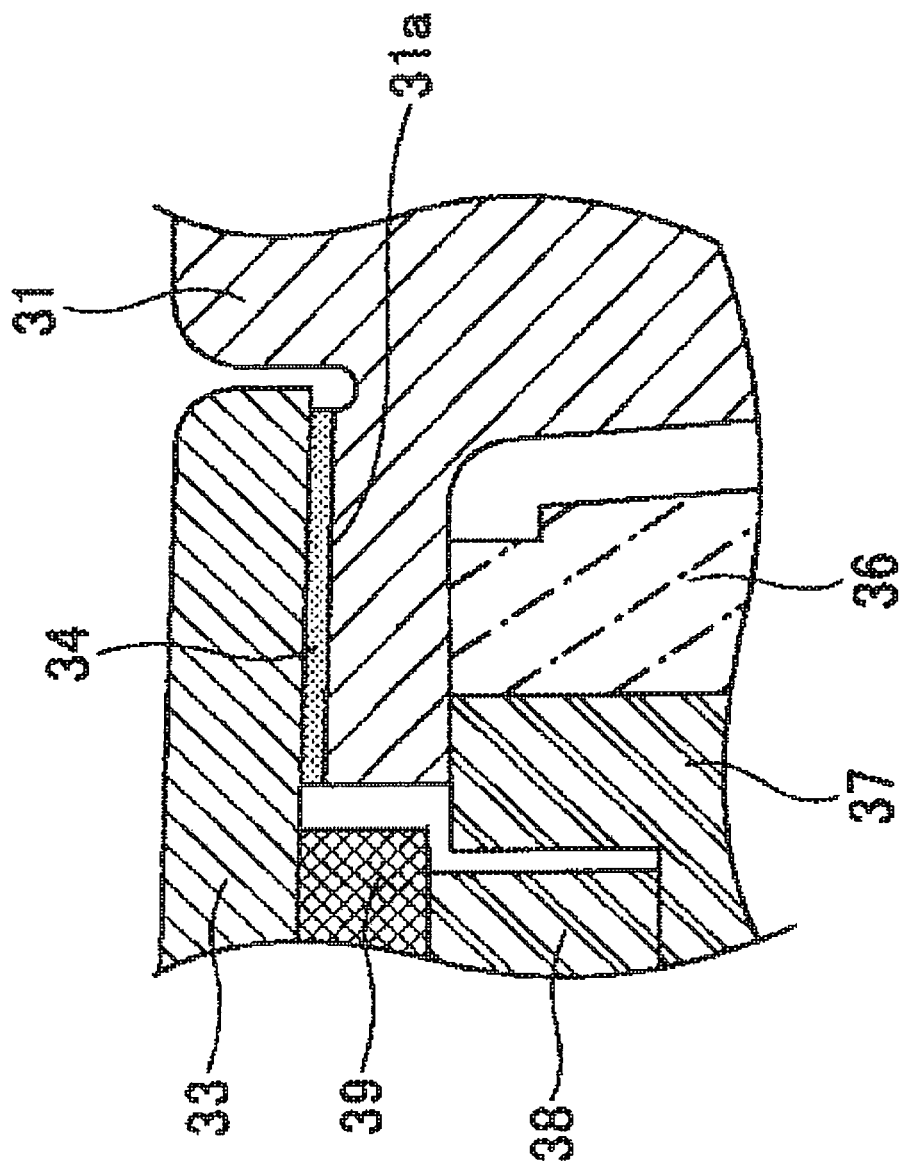

LIQUID CRYSTAL DISPLAY DEVICE

CROSS-REFERENCE TO RELATED APPLICATIONS

This application is a U.S. divisional application filed under 37 C.F.R. 1.53(b) claiming priority benefit of U.S. application Ser. No. 12/230,997, filed Sep. 9, 2008, now U.S. Pat. No. 8,081,269, which application in turn claims earlier priority benefit to Japanese Patent Application No. 2007-247322, filed on Sep. 25, 2007, the entire contents of which are incorporated herein by reference.

BACKGROUND

1. Field

It relates to a liquid crystal display device. In particular, it relates to a liquid crystal display such as a portable information terminal, which is equipped with a liquid crystal display device including a liquid crystal display protection panel and a liquid crystal module including a liquid crystal display (LCD) panel.

2. Description of the Related Art

Liquid crystal display devices have been widely used for display units of various electronic devices such as a portable information terminal such as a cell phone or a PDA (personal digital assistants), a portable PC (personal computer) such as a laptop PC, a desktop PC, and a television on account of being thin and lightweight as well as because of low-voltage driving and power-saving.

FIG. 1 is a front view of a conventional cell phone equipped with a liquid crystal display device.

A cell phone 10 of FIG. 1 includes a stationary-side case 1 and a movable-side case 3 coupled with the stationary-side case 1 through a hinge 2 in a foldable manner. In the illustrated example of FIG. 1, the movable-side case 3 of the cell phone 10 is opened.

The stationary-side case 1 has a flat, substantially rectangular shape. An inner surface 4 of the stationary-side case 1 is provided with, for example, plural push buttons 5, 6, and 7. Further, an inner surface 8 of the movable-side case 3 is provided with, for example, a liquid crystal display device 9.

FIG. 2 is a cross-sectional view of the liquid crystal display device 9 of FIG. 1.

As shown in FIG. 2, the liquid crystal display device 9 includes a front case 11, a rear case 12, and an LCD (liquid crystal display) protection panel 13.

The front case 11 is a molded case made of a resin or magnesium alloy, for example. A lower surface of the front case 11 is bonded to an upper end of the rear case 12 by means of claws or screws.

A liquid crystal display protection panel mounting surface 11a extends from an upper portion of the front case 11. The LCD protection panel 13 made of polymethyl methacrylate (PMMA) as an acrylic polymer is placed on the liquid crystal display protection panel mounting surface 11a through a double-faced adhesive tape 14, for example.

FIG. 3 is an enlarged view of a portion A enclosed by the dotted line of FIG. 2. As shown in FIG. 3, the liquid crystal display protection panel mounting surface 11a is a flat surface substantially parallel to the horizontal. An outer edge of the LCD protection panel 13 is fixed onto the liquid crystal display protection panel mounting surface 11a by the double-faced adhesive tape 14. Further, there is no space but a small gap resulting from dimensional tolerances, between an end face of the LCD protection panel 13 and an inner surface of the upper portion of the front case 11.

Referring back to FIG. 2, a concave liquid crystal module holder 16 having a substrate 15 attached to the bottom is provided inside the front case 11. Electronic components such as a chip capacitor are mounted onto the substrate 15 but are not illustrated in FIG. 2. Liquid crystal modules 17 and 18 are nested into the concave portion of the liquid crystal module holder 16. By the way, the liquid crystal module 18 is a liquid crystal display (LCD) panel, and the liquid crystal module 17 is a liquid crystal display (LCD) panel holder for holding the LCD panel 18.

An upper edge of the liquid crystal module holder 16 is in contact with a lower side of the upper portion of the front case 11. The liquid crystal module holder 16 supports the front case 11. Further, a dustproof gasket 19 made of cushioning such as urethane foam rubber is put on an upper edge of the liquid crystal module 18. The dustproof gasket 19 is in contact with a lower surface of the LCD protection panel 13. This structure protects the liquid crystal modules 17 and 18 from dust.

In addition, Japanese Laid-open Patent Publication No. 2004-111153 proposes a backlight and a liquid crystal display device, which include a light source supporting member for supporting a light source to a chassis or a corner portion of a light reflecting member, and in which a reflector is partially positioned between the chassis and the light source supporting member, and the light source supporting member controls movement of a front edge portion of the reflector relative to the chassis in a direction parallel to a front side of a light guide.

However, the structure of FIG. 2 involves the following problems. Referring to cross-sectional views of FIGS. 4A and 4B similar to FIG. 2, the problems are described below.

The LCD protection panel 13 tends to expand in the direction of the arrow of FIG. 4A due to temperature rise or moisture absorption. How much the LCD protection panel 13 extends due to the expansion resulting from moisture absorption varies depending on water absorption, a panel thickness, etc. If the LCD protection panel 13 is made of, for example, polymethyl methacrylate (PMMA) as an acrylic polymer, the water absorption is 0.3%.

On the other hand, as described above, the outer edge of the lower surface of the LCD protection panel 13 is fixed onto the liquid crystal display protection panel mounting surface 11a through the double-faced adhesive tape 14. Further, there is no space but a small gap resulting from dimensional tolerances, between the end face of the LCD protection panel 13 and the inner surface of the upper portion of the front case 11.

Therefore, although the LCD protection panel 13 tends to expand due to temperature rise or moisture absorption, the extension in a horizontal direction (direction of the arrow of FIG. 4A) resulting from the expansion is restricted.

As a result, as shown in FIG. 4B, the LCD protection panel 13 warps inwardly (downwardly in FIG. 4B) according to the expansion, and the lower surface of the LCD protection panel 13 comes into contact (interferes) with the upper surface of the LCD panel 18 in some cases. If the lower surface of the LCD protection panel 13 comes into contact with the upper surface of the LCD panel 18, the contact portion looks like a droplet infiltrated in a space between the LCD protection panel 13 and the LCD panel 18. As a result, there is no choice but to repair the liquid crystal display device 9.

One conceivable countermeasure against such a problem is to secure enough space between the lower surface of the LCD protection panel 13 and the upper surface of the LCD panel 18 not to bring the lower surface of the LCD protection panel 13 and the upper surface of the LCD panel 18 into contact with each other even if the LCD protection panel 13 expands.

However, this structure leads to enlargement of the liquid crystal display device 9 and thus the cell phone 10.

SUMMARY

According to an aspect of an embodiment, a liquid crystal display device includes a liquid crystal display panel, a liquid crystal display protection panel set above the liquid crystal display panel so as to protect a display surface of the liquid crystal display panel, the liquid crystal display protection panel being warped with its central portion being protruded, and a frame supporting the liquid crystal display panel and the liquid crystal display protection panel.

BRIEF DESCRIPTION OF THE DRAWINGS

The above object and features of the present invention will be more apparent from the following description of some preferred embodiments with reference to the accompanying drawings, wherein:

FIG. 3 is an enlarged view of a portion A enclosed by the dotted line of FIG. 2;

FIG. 6 is a cross-sectional view of the liquid crystal display device of FIG. 5;

FIG. 7 is an enlarged view of a portion A enclosed by the dotted line of FIG. 6;

DESCRIPTION OF EMBODIMENTS

Hereinafter, embodiments will be described.

1. First Embodiment

Figure 5:
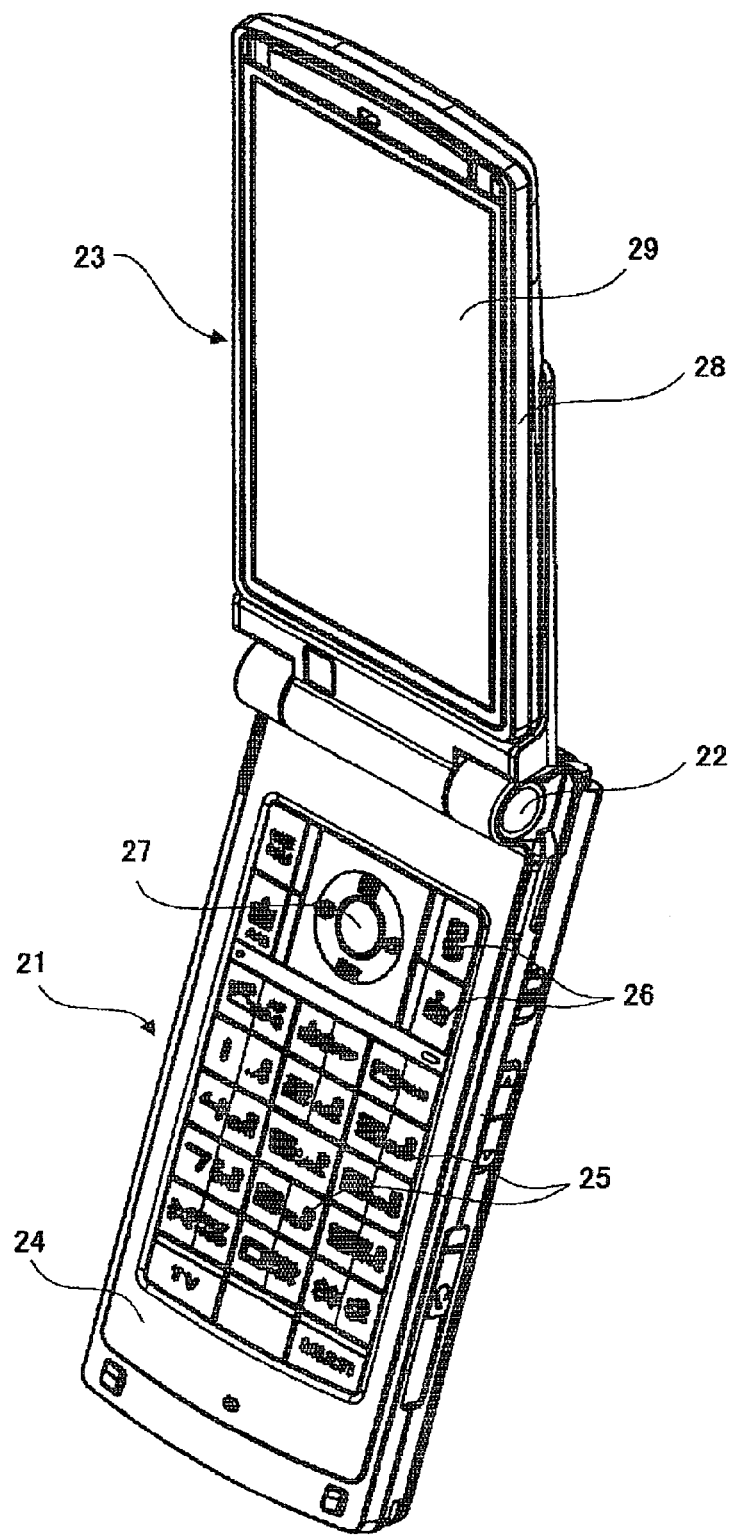
FIG. 5 is a perspective view of a cell phone equipped with a liquid crystal display device according to a first embodiment of the present invention.

FIG. 5 is a perspective view of a cell phone equipped with a liquid crystal display device according to a first embodiment.

A cell phone 20 of FIG. 5 includes a stationary-side case 21 and a movable-side case 23 coupled with the stationary-side case 21 through a hinge 22 in a foldable manner. In the illustrated example of FIG. 5, the movable-side case 23 of the cell phone 20 is opened.

The stationary-side case 21 has a flat, substantially rectangular shape. An inner surface 24 of the stationary-side case 21 is provided with, for example, plural push buttons 25, 26, and 27. Further, an inner surface 28 of the movable-side case 23 is provided with, for example, a liquid crystal display device 29.

FIG. 6 is a cross-sectional view of the liquid crystal display device 29 of FIG. 5.

As shown in FIG. 6, the liquid crystal display device 29 includes a front case (case unit) 31, a rear case 32, an LCD (liquid crystal display) protection panel 33, and the like.

The front case 31 is molded using, for example, a resin or magnesium alloy. A lower surface of the front case 31 is bonded to an upper end of the rear case 32 by means of claws or screws.

A liquid crystal display protection panel mounting surface 31a extends from an upper portion of the front case 31. The LCD protection panel 33 made of polymethyl methacrylate (PMMA) as an acrylic polymer is placed on the liquid crystal display protection panel mounting surface 31a through a double-faced adhesive tape 34, for example.

FIG. 7 is an enlarged view of a portion A enclosed by the dotted line of FIG. 6.

As shown in FIG. 7, the liquid crystal display protection panel mounting surface 31a is curved such that the height of the LCD protection panel 33 on its central side is higher than that on its peripheral side. The peripheral portion of the LCD protection panel 33 is fixed onto the thus-curved liquid crystal display protection panel mounting surface 31a through the double-faced adhesive tape 34. Thus, as shown in FIG. 6, the LCD protection panel 33 is formed into such a curved shape that its central portion protrudes, that is, the LCD protection panel 33 upwardly warps.

The shape of the liquid crystal display protection panel mounting surface 31a is not limited to the curved shape but may be any other shape adapted to a tapered shape of the LCD protection panel 33 with its height on the central side being higher than that on the peripheral side. In this case as well, the LCD protection panel 33 is formed into such a curved shape that its central portion protrudes, that is, the LCD protection panel 33 upwardly warps.

There is no space but a small gap resulting from dimensional tolerances, between an end face of the LCD protection panel 33 and an inner surface of the upper portion of the front case 31.

A concave liquid crystal module holder 36 having a substrate 35 attached to the bottom is provided inside the front case 31. The liquid crystal module holder 36 is made of, for example, stainless steel (SAS). A material for the liquid crystal module holder 36 is not particularly limited, and a resin or magnesium alloy may be molded into the liquid crystal module holder 36.

Electronic components such as a chip capacitor are mounted onto the substrate 35 but are not illustrated in FIG. 6. Liquid crystal modules 37 and 38 are nested into the concave portion of the liquid crystal module holder 36. By the way, the liquid crystal module 38 is a liquid crystal display (LCD) panel, and the liquid crystal module 37 is a liquid crystal display (LCD) panel holder for holding the LCD panel 38.

An upper edge of the liquid crystal module holder 36 is in contact with an upper portion of the front case 31. The liquid crystal module holder 36 supports the front case 31. A dustproof gasket 39 made of cushioning such as urethane form rubber is put on an upper edge of the liquid crystal module 38. The dustproof gasket 39 is in contact with a lower surface of the LCD protection panel 33. This structure protects the liquid crystal modules 37 and 38 from powder dust.

Figure 8A:
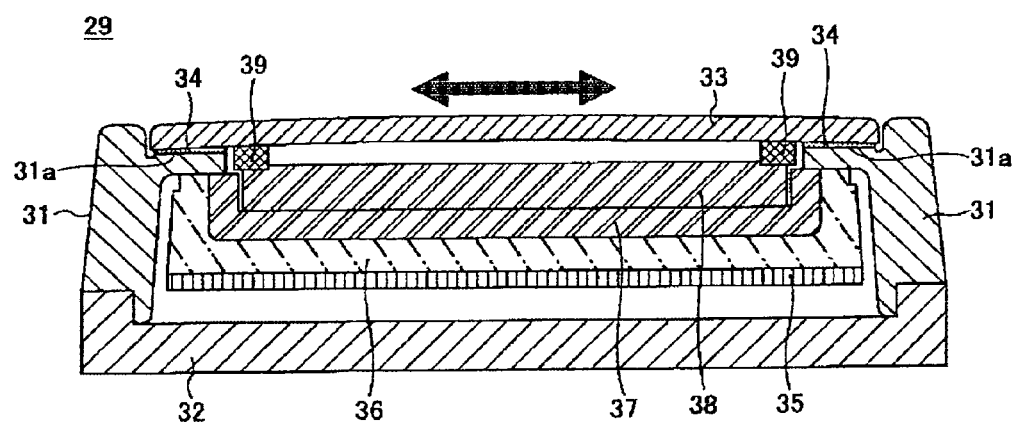
FIGS. 8A and 8B show how a liquid crystal display protection panel of FIG. 6 expands.
Figure 8B:
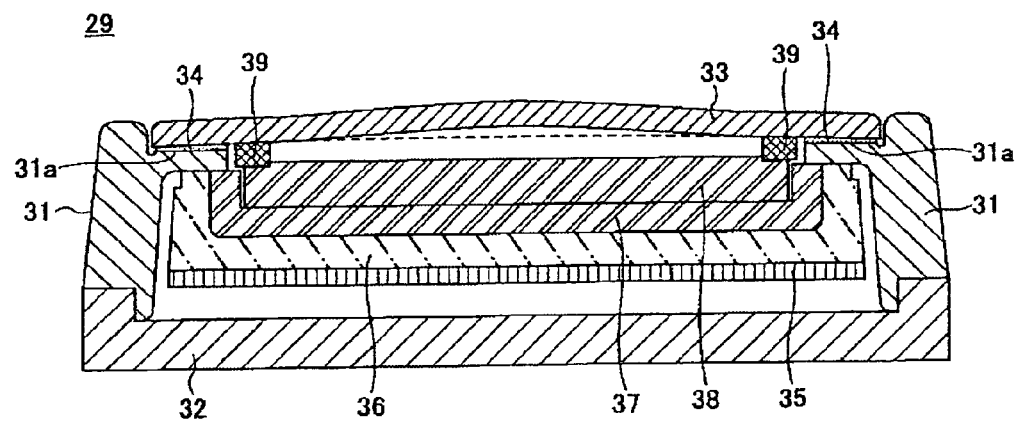

The thus-structured LCD protection panel 33 tends to expand in the direction of the arrow of FIG. 8A due to temperature rise or moisture absorption. However, as described above, the outer edge of the lower surface of the LCD protection panel 33 is fixed onto the liquid crystal display protection panel mounting surface 31a by means of the double-faced adhesive tape 34, so the extension in a horizontal direction (direction of the arrow of FIG. 8A) is restricted. FIGS. 8A and 8B are cross-sectional views similar to FIG. 6.

Further, as described above, the LCD protection panel 33 has such a curved shape that its height on the central side is higher than that on the peripheral side. The LCD protection panel 33 is previously curved such that its central portion upwardly protrudes. Accordingly, enough clearance is secured between the lower surface of the LCD protection panel 33 and the upper surface of the LCD panel 38. Thus, as shown in FIG. 8B, the lower surface of the LCD protection panel 33 can be kept from contact (interfering) with the upper surface of the LCD panel 38.

Since the LCD protection panel 33 is previously curved such that its central portion upwardly protrudes, the LCD protection panel 33 could warp upwardly (upwardly in FIG. 8B) due to expansion but does not warp downwardly (downwardly in FIG. 8B). That is, the LCD protection panel 33 can warp upwardly only (in a direction of increasing a distance from the upper surface of the LCD panel 38). Thus, as shown in FIG. 8B, the lower surface of the LCD protection panel 33 can be kept from contact (interfering) with the upper surface of the LCD panel 38.

As described above, according to the structure of this embodiment, the lower surface of the LCD protection panel 33 can be kept from contact (interfering) with the upper surface of the liquid crystal module 38. Hence, it is possible to avoid a phenomenon that looks as if a droplet infiltrates in between the LCD protection panel 33 and the liquid crystal module 38 can be avoided without increasing the gaps between the lower surface of the LCD protection panel 33 and the upper surface of the liquid crystal module 38.

The liquid crystal display device 29 is illustrated in FIG. 6 in cross-section. However, this structure is also applicable to the longitudinal-section structure of the liquid crystal display device 29.

2. Second Embodiment

Figure 9:
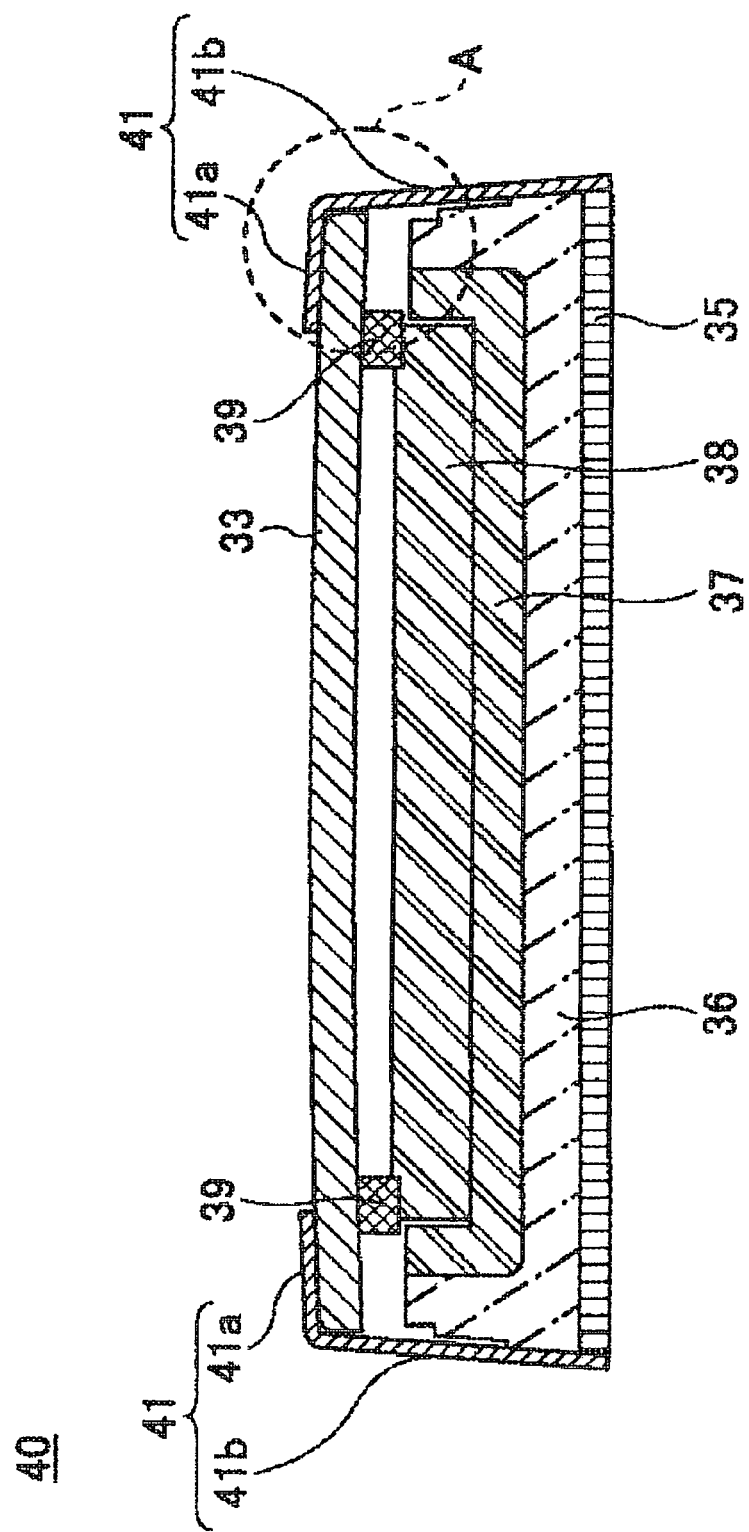
FIG. 9 is a sectional view of a liquid crystal display device according to a second embodiment of the present invention.

FIG. 9 is a sectional view of a liquid crystal display device 40 according to a second embodiment. In FIG. 9, the same components as those of FIG. 6 are denoted by identical reference numerals, and detailed description thereof is omitted. The rear case 32 (see FIG. 6) provided below the substrate 35 is omitted from FIG. 9.

In the liquid crystal display device 29 of the first embodiment, the LCD protection panel 33 is placed on the liquid crystal display protection panel mounting surface 31a extending from the upper portion of the front case 31 through the double-faced adhesive tape 34. In the liquid crystal display device 40 of the second embodiment, the front case 31 and the double-faced adhesive tape 34 are not used, but a frame 41 as a plate-like member bent at substantially right angle is used.

The frame 41 is composed of a liquid crystal display protection panel contact portion 41a and a holder connection portion 41b extending from the liquid crystal display protection panel contact portion 41a and bent at substantially right angel to the liquid crystal display protection panel contact portion 41a. The liquid crystal display protection panel contact portion 41a is positioned over both ends of an upper surface of the LCD protection panel 33 and the vicinities thereof. The holder connection portion 41b is connected to the liquid crystal module holder 36 through engagement of claws (not shown) with holes (not shown) formed in the holder connection portion 41b, the claws being formed in corresponding positions on the liquid crystal module holder 36.

Figure 10:
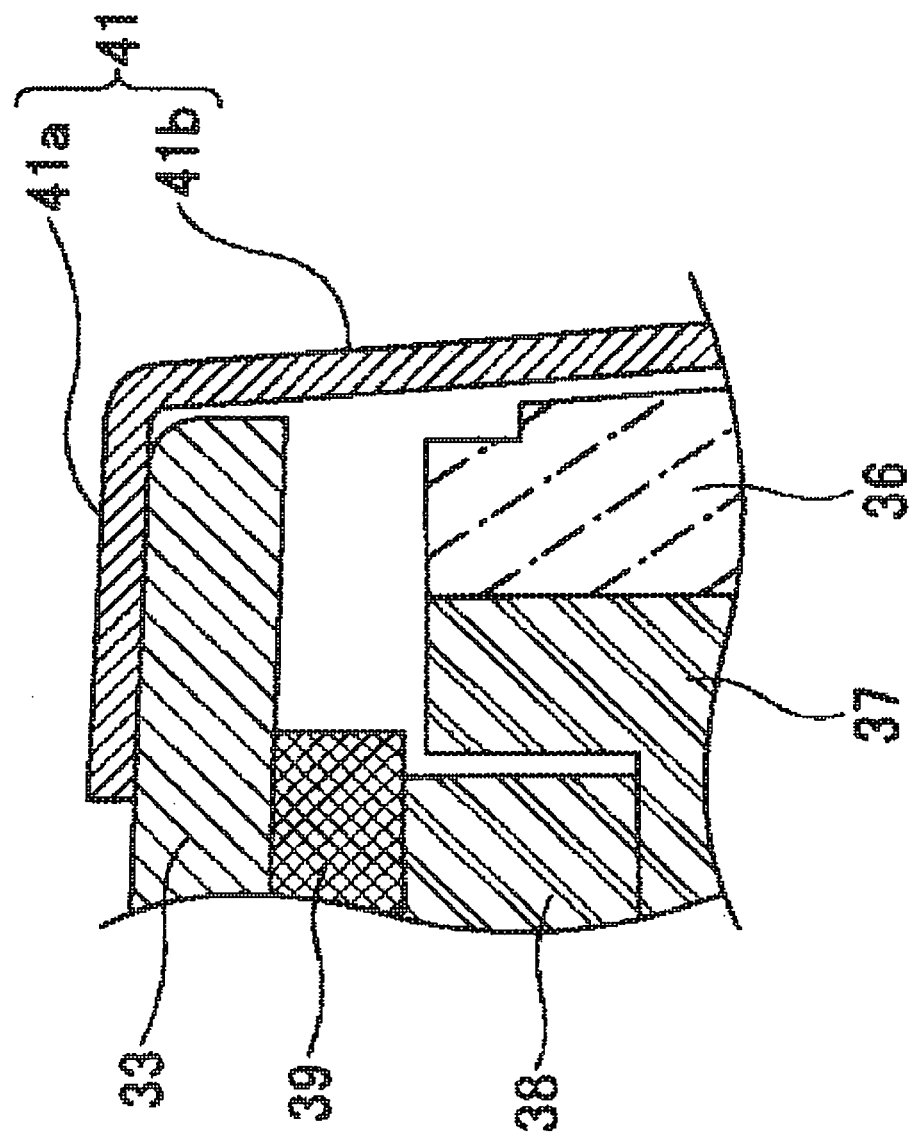
FIG. 10 is an enlarged view of a portion A enclosed by the dotted line of FIG. 9.

FIG. 10 is an enlarged view of a portion A enclosed by the dotted line of FIG. 9.

As shown in FIG. 10, the liquid crystal display protection panel contact portion 41a is curved such that its height is higher on the central side of the LCD protection panel 33 that on the peripheral side. Thus, as shown in FIG. 9, the LCD protection panel 33 is curved such that its central portion protrudes, that is, the LCD protection panel 33 warps upwardly, combined with a repulsive force of the dustproof gasket 39 for supporting the LCD protection panel 33 from below the LCD protection panel 33, from the lower surface of the LCD protection panel 33.

The thus-structured frame 41 is made of, for example, stainless steel (SAS). A stainless-steel plate-like member is used for the frame 41 to thereby reduce the total thickness of the device. Here, a material for the frame 41 is not particularly limited, but a resin or magnesium alloy may be molded into the frame 41. Further, it is possible to mold a resin or magnesium alloy into an armor and cover the frame 41 with the armor.

Further, there is no space but a small gap resulting from dimensional tolerances, between an end face of the LCD protection panel 33 and an inner surface of the upper portion of the liquid crystal display protection panel contact portion 41a.

Figure 11A:
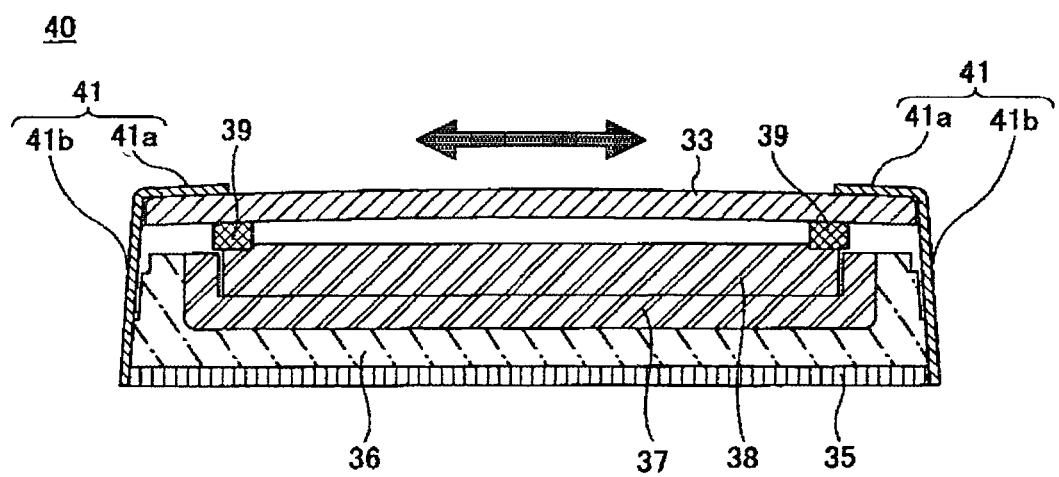
FIGS. 11A and 11B show how a liquid crystal display protection panel of FIG. 9 expands.
Figure 11B:
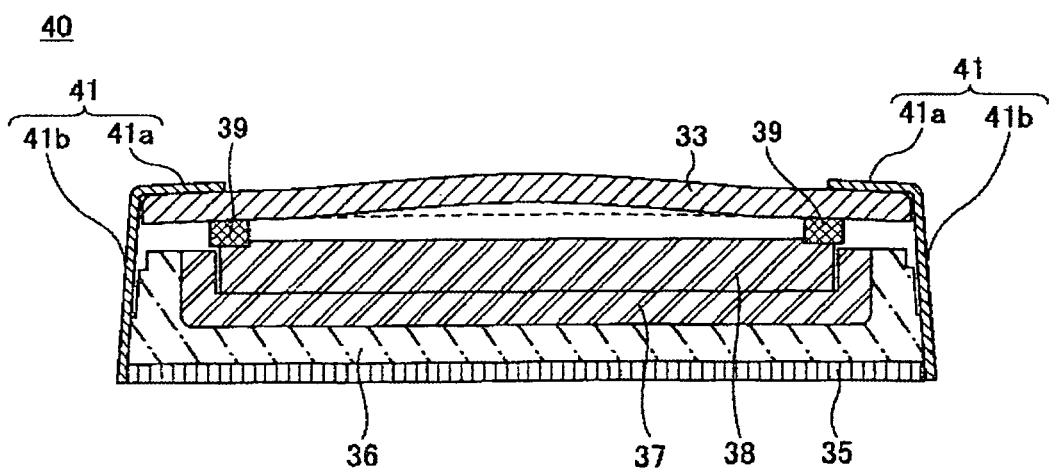

The thus-structured LCD protection panel 33 tends to expand in the direction of the arrow of FIG. 11A due to temperature rise or moisture absorption. FIGS. 11A and 11B are sectional views similar to FIG. 9.

As described above, however, the LCD protection panel 33 has such a curved shape that its height on the central side is higher than that on the peripheral side. The LCD protection panel 33 is previously curved such that its central portion upwardly protrudes. Accordingly, enough clearance is secured between the lower surface of the LCD protection panel 33 and the upper surface of the LCD panel 38. Thus, as shown in FIG. 11B, the lower surface of the LCD protection panel 33 can be kept from contact (interfering) with the upper surface of the LCD panel 38.

Since the LCD protection panel 33 is previously curved such that its central portion upwardly protrudes, the LCD protection panel 33 could warp upwardly (upwardly in FIG. 11B) due to expansion but does not warp downwardly (downwardly in FIG. 11B). That is, the LCD protection panel 33 can warp upwardly only (in a direction of increasing a distance from the upper surface of the LCD panel 38). Thus, as shown in FIG. 11B, the lower surface of the LCD protection panel 33 can be kept from contact (interfering) with the upper surface of the LCD panel 38.

As described above, according to the structure of this embodiment, the lower surface of the LCD protection panel 33 can be kept from contact (interfering) with the upper surface of the liquid crystal module 38. Hence, it is possible to avoid a phenomenon that looks as if a droplet infiltrates in between the LCD protection panel 33 and the liquid crystal module 38 can be avoided without increasing the gaps between the lower surface of the LCD protection panel 33 and the upper surface of the liquid crystal module 38.

The liquid crystal display device 40 is illustrated in FIG. 8 in cross-section. However, this structure is also applicable to the longitudinal-section structure of the liquid crystal display device 40.

In the above example, the liquid crystal display protection panel contact portion 41a is curved such that its height is higher on the central side of the LCD protection panel 33 than on the peripheral side. However, the shape of the frame 41 is not limited to the curved shape but may be a tapered shape in which its height is higher on the central side of the LCD protection panel 33 than on the peripheral side.

3. Third Embodiment

Figure 12:
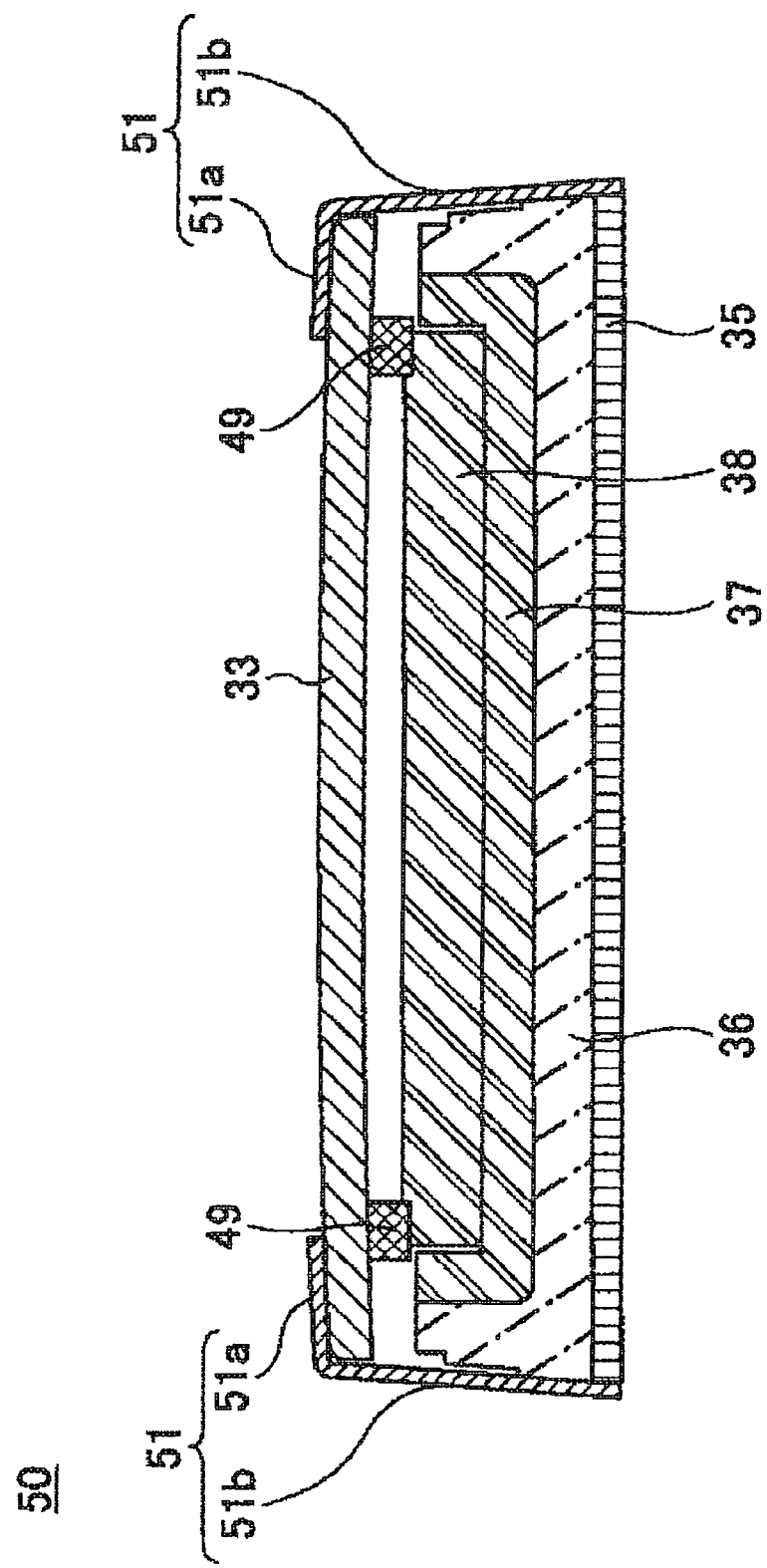
FIG. 12 is a sectional view of a liquid crystal display device according to a third embodiment of the present invention.

FIG. 12 is a sectional view of a liquid crystal display device 50 according to a third embodiment. In FIG. 12, the same components as those of FIG. 9 are denoted by identical reference numerals, and detailed description thereof is omitted. The rear case 32 (see FIG. 6) provided below the substrate 35 is omitted from FIG. 12 similar to FIG. 9.

Figure 1:
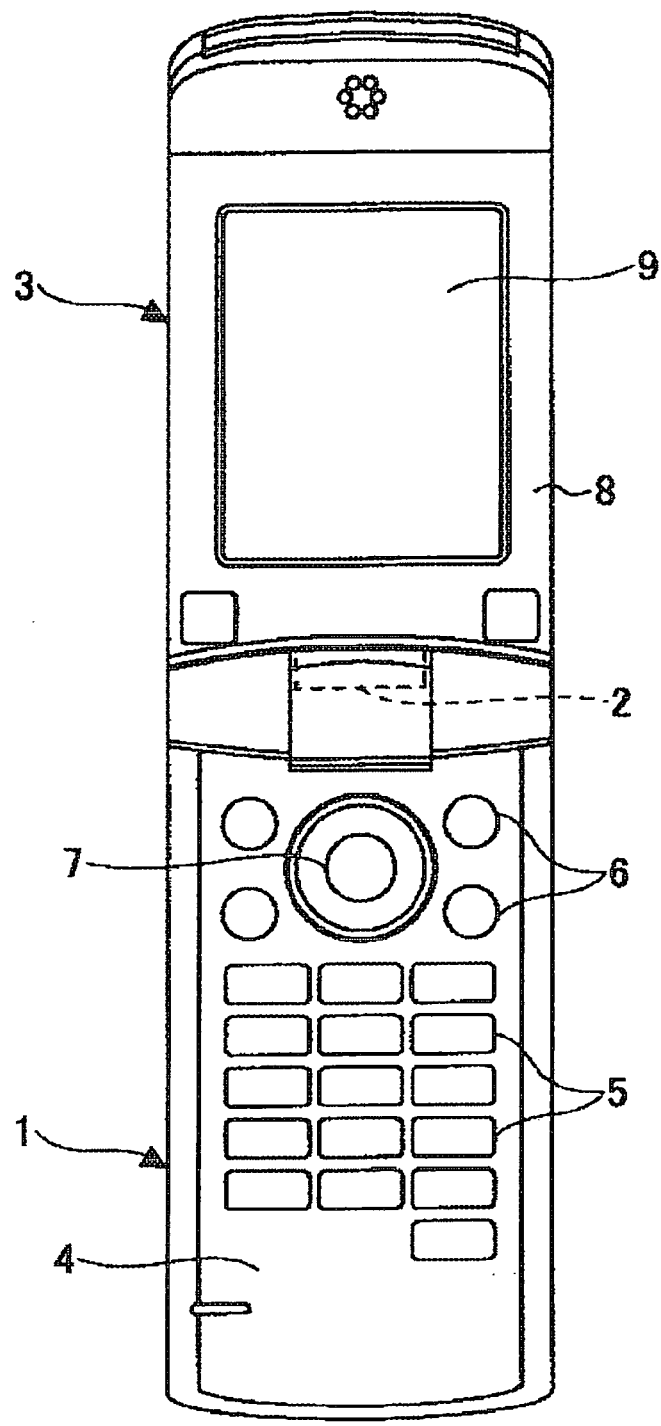
FIG. 1 is a front view of a conventional cell phone equipped with a liquid crystal display device.
Figure 2:
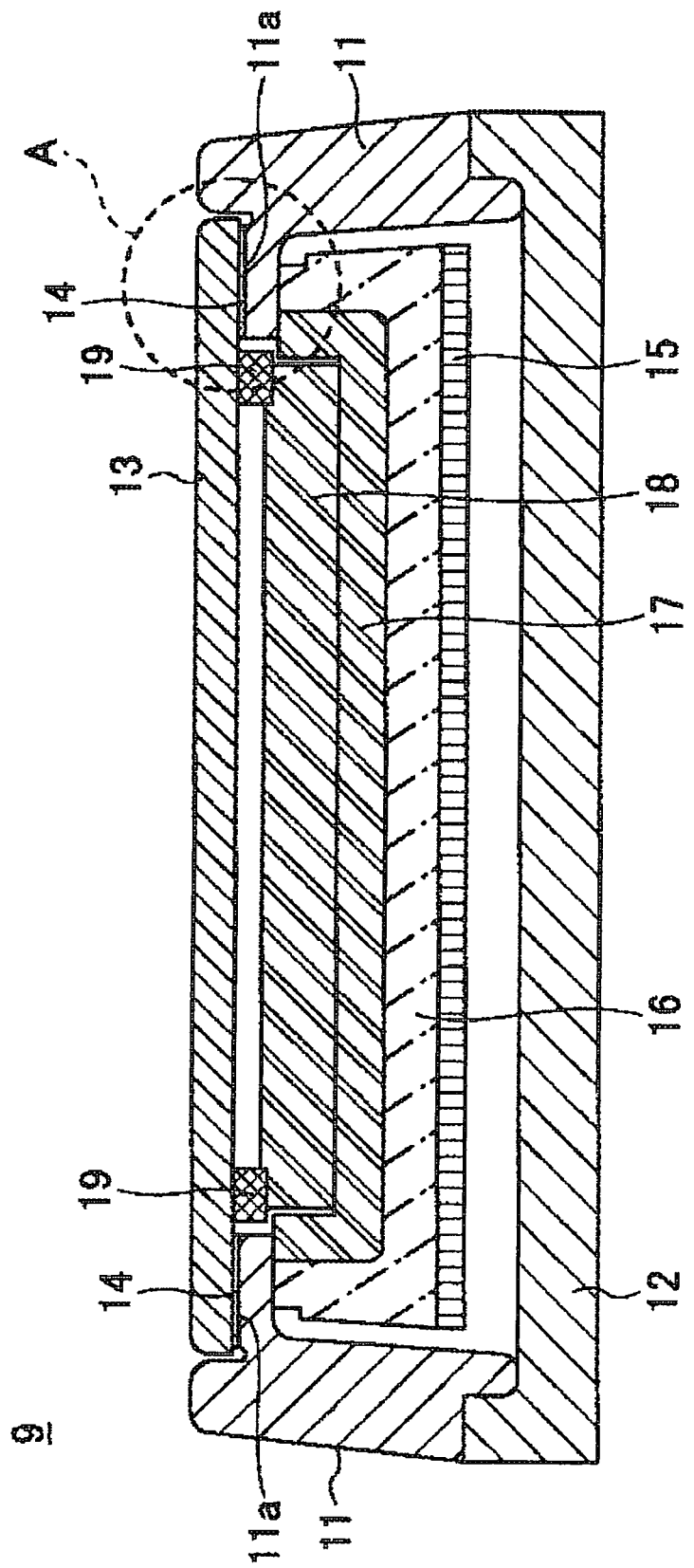
FIG. 2 is a cross-sectional view of the liquid crystal display device of FIG. 1.
Figure 4A:
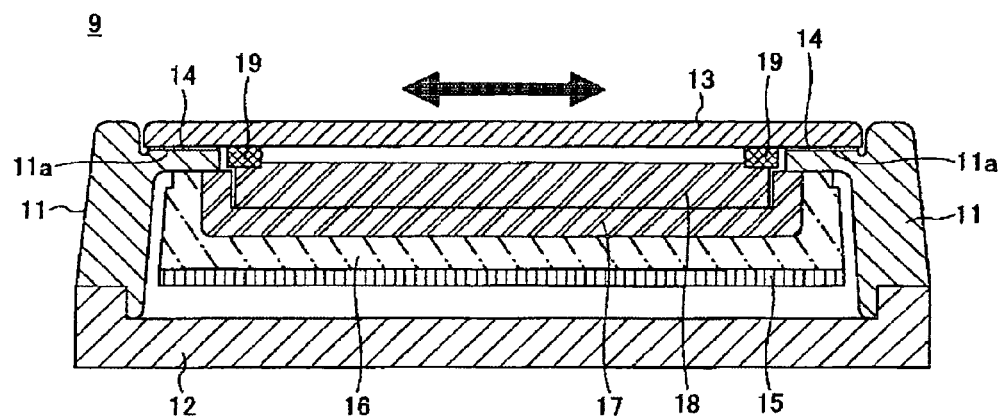
FIGS. 4A and 4B are sectional views illustrating problems of the conventional liquid crystal display device.
Figure 4B:
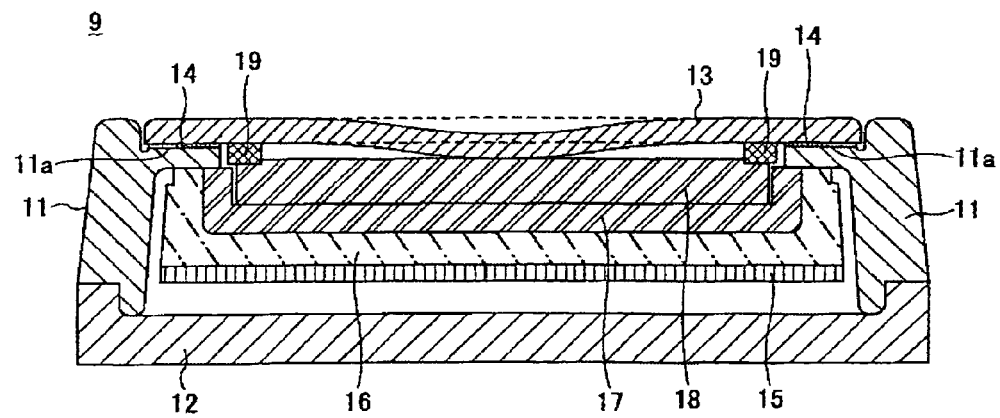

In the liquid crystal display device 40 of the second embodiment, the liquid crystal display protection panel contact portion 41a of the frame 41 (see FIG. 9) is curved such that its height is higher on the central side of the LCD protection panel 33 than on the peripheral side. In the liquid crystal display device 50 of the third embodiment, a liquid crystal display protection panel contact portion 51a of a frame 51 is a flat surface that is substantially parallel to the horizontal. Further, a compressibility of a dustproof gasket 49 for supporting the LCD protection panel 33 from below the LCD protection panel 33 is set higher than that of a dustproof gasket 19 of the conventional structure shown in FIG. 2, for example, 50% or more.

Since, the compressibility of the dustproof gasket 49 for supporting the LCD protection panel 33 from below the LCD protection panel 33, that is, the repulsive force is set high, the LCD protection panel 33 is curved together with the frame 51 having the liquid crystal display protection panel contact portion 51a in contact with an upper surface of the LCD protection panel 33, with its central portion protruding upwardly. In other words, although the compressibility of the dustproof gasket 49 is calculated in consideration of the structure or plate thickness of the frame 51, the compressibility is set such that the LCD protection panel 33 is curved together with the frame 51, with its central portion protruding upwardly.

The thus-structured LCD protection panel 33 tends to expand in the horizontal direction due to temperature rise or moisture absorption.

However, as described above, the LCD protection panel 33 is curved together with the frame 51 having the liquid crystal display protection panel contact portion 51a in contact with an upper surface of the LCD protection panel 33, with its central portion protruding upwardly. Therefore, enough clearance is secured between the lower surface of the LCD protection panel 33 and the upper surface of the LCD panel 38. Thus, the lower surface of the LCD protection panel 33 can be kept from contact (interfering) with the upper surface of the LCD panel 38.

Further, the LCD protection panel 33 is curved such that its central portion protrudes upwardly due to the dustproof gasket 49. Thus, the LCD protection panel 33 could warp upwardly (upwardly in FIG. 12) due to expansion but does not warp downwardly (downwardly in FIG. 12). That is, the LCD protection panel 33 can warp upwardly only (in a direction of increasing a distance from the upper surface of the LCD panel 38). Thus, the lower surface of the LCD protection panel 33 can be kept from contact (interfering) with the upper surface of the LCD panel 38.

As described above, according to the structure of this embodiment as well, the lower surface of the LCD protection panel 33 can be kept from contact (interfering) with the upper surface of the liquid crystal module 38. Hence, it is possible to avoid a phenomenon that looks as if a droplet infiltrates in between the LCD protection panel 33 and the liquid crystal module 38 can be avoided without increasing the gaps between the lower surface of the LCD protection panel 33 and the upper surface of the liquid crystal module 38.

The liquid crystal display device 50 is illustrated in FIG. 12 in cross-section. However, this structure is also applicable to the longitudinal-section structure of the liquid crystal display device 50.

4. Fourth Embodiment

Figure 13:
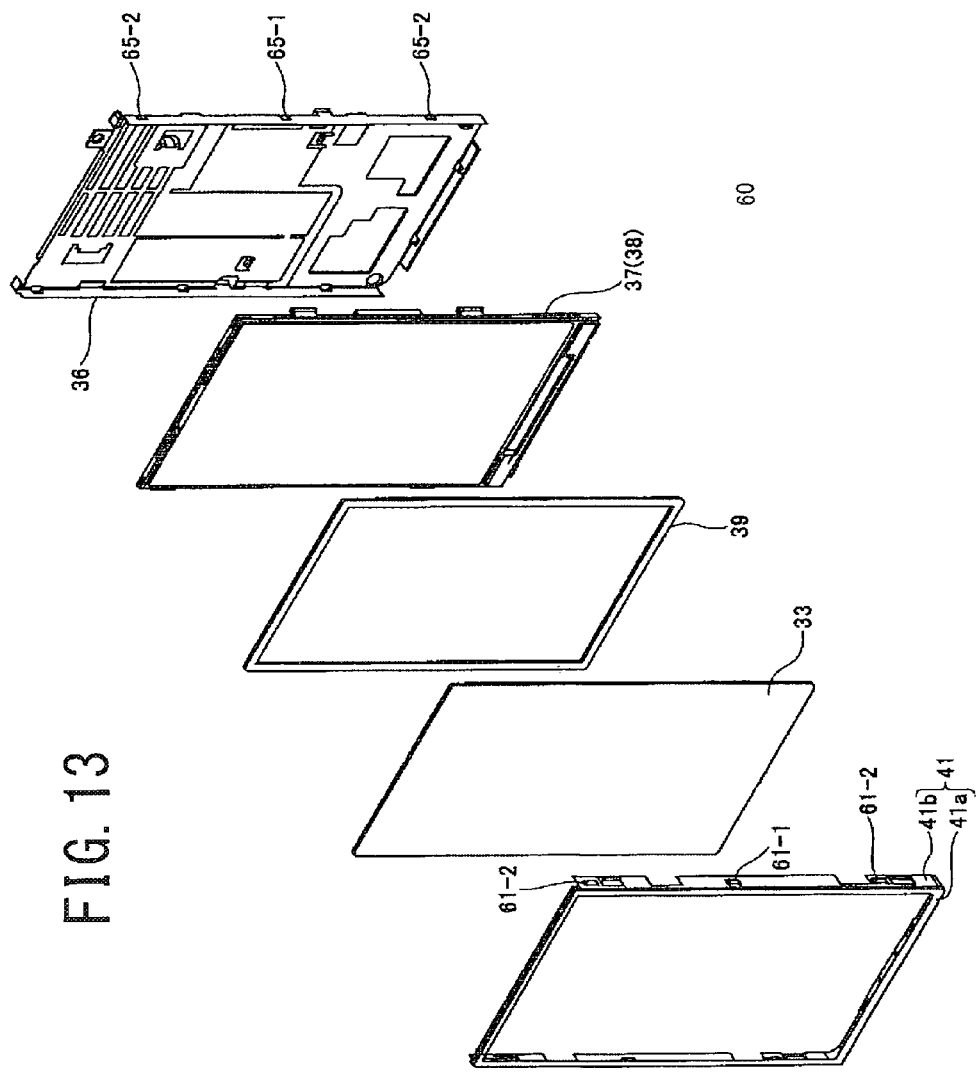
FIG. 13 is an exploded perspective view of a liquid crystal display device according to a fourth embodiment of the present invention.
Figure 14:
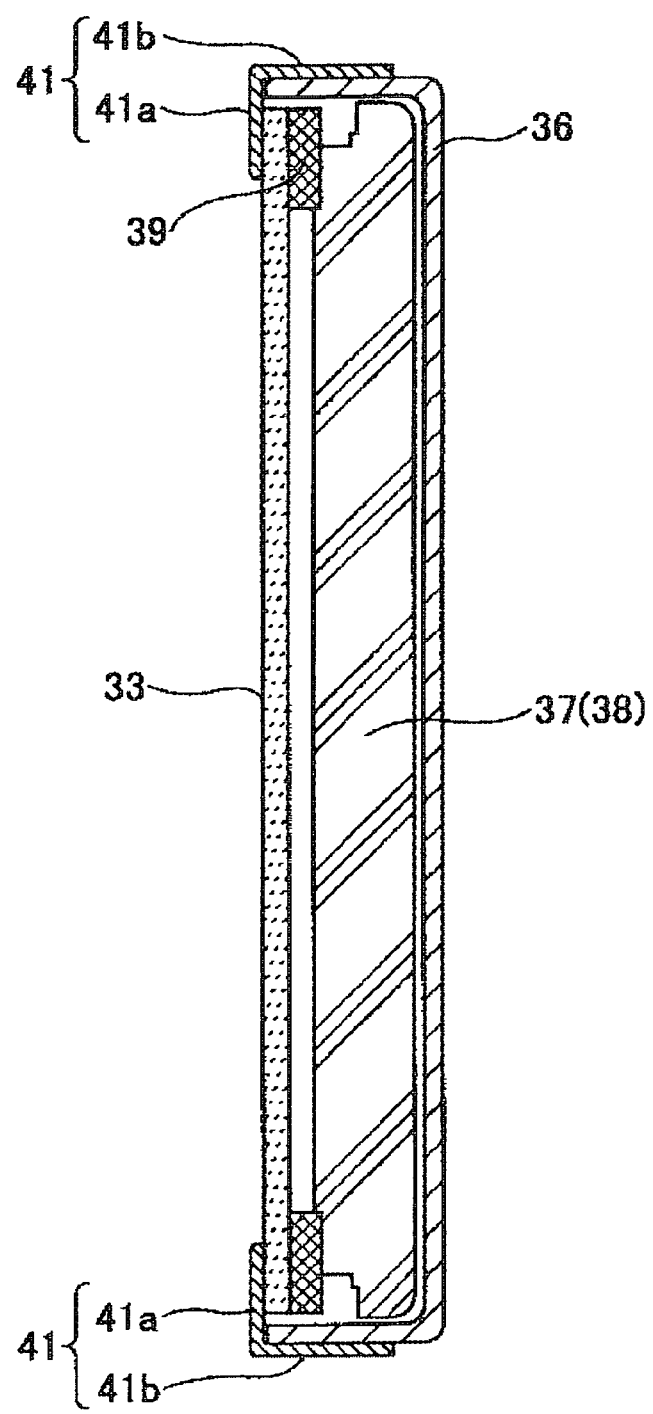
FIG. 14 is a longitudinal sectional view of the liquid crystal display device of FIG. 13.
Figure 15:
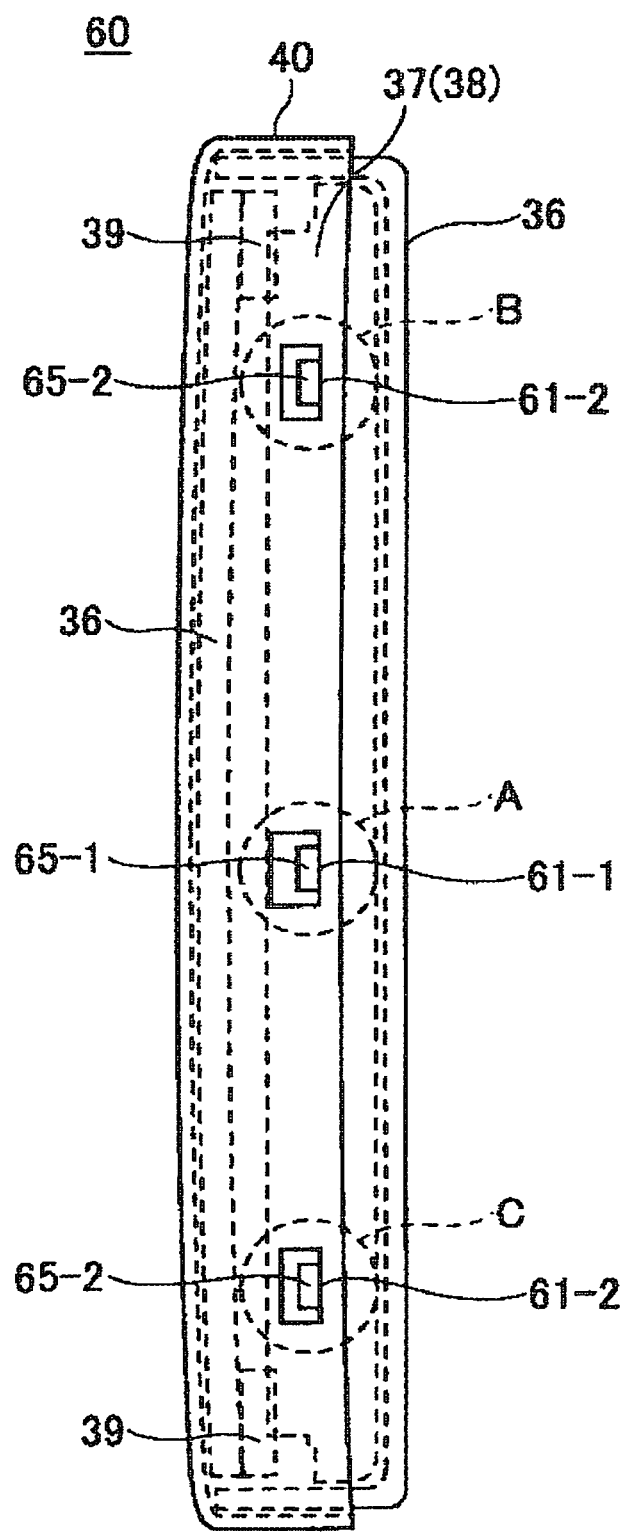
FIG. 15 is a longitudinal side view of the liquid crystal display device of FIG. 13.

FIG. 13 is an exploded perspective view of a liquid crystal display device 60 according to a fourth embodiment. FIG. 14 is a longitudinal sectional view of the liquid crystal display device 60. FIG. 15 is a longitudinal side view of the liquid crystal display device 60. In FIGS. 13 to 15, the same components as those of FIG. 9 are denoted by identical reference numerals, and detailed description thereof is omitted.

Three holes 61-1, 61-2 are formed in a longitudinal surface of the holder connection portion 41b of the frame 41, and claws 65-1, 65-2 are formed in corresponding positions on a side surface of the liquid crystal module holder 36. The claws 65-1, 65-2 of the liquid crystal module holder 36 are engaged with the holes 61-1, 61-2 of the holder connection portion 41b of the frame 41 to thereby connect the holder connection portion 41b of the frame 41 to the liquid crystal module holder 36.

Figure 16A:
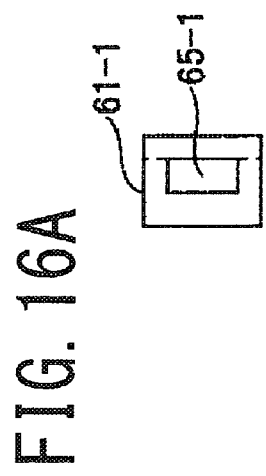
FIGS. 16A to 16C show the structure in which a claw of a liquid crystal module holder is engaged with a hole of a holder connection portion of a frame of FIG. 13.
Figure 16B:
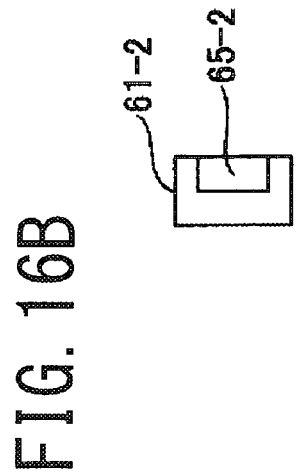
Figure 16C:
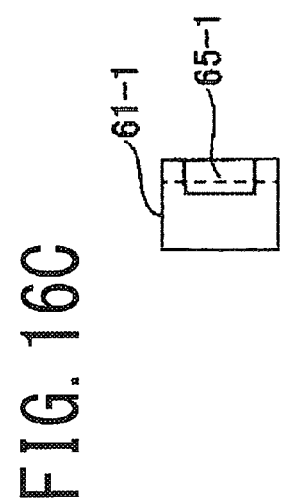

FIGS. 16A to 16C show the structure in which the claws 65-1, 65-2 of the liquid crystal module holder 36 are engaged with the holes 61-1, 61-2 of the holder connection portion 41b of the frame 41. FIG. 16A shows the structure in which a claw 65-1 of the liquid crystal module holder 36 is engaged with a corresponding hole 61-1 formed at substantially the center of the longitudinal surface of the holder connection portion 41b. FIG. 16B shows the structure in which a claw 65-2 of the liquid crystal module holder 36 is engaged with a corresponding hole 61-2 formed at an end portion of the longitudinal surface of the holder connection portion 41b. FIG. 16C shows the hole 61-1 and the claw 65-1 in the case where the frame 41 warps with its central portion protruding in a longitudinal direction.

As apparent from FIGS. 16A and 16B, the hole 61-1 formed at substantially the center of the longitudinal surface of the holder connection portion 41b is larger than the holes 61-2 formed at the end portions of the longitudinal surface of the holder connection portion 41b. Thus, the engagement of the claw 65-1 of the liquid crystal module holder 36 with a corresponding hole 61-1 formed at substantially the center of the longitudinal surface of the holder connection portion 41b (see FIG. 16A) is less tight than the engagement of the claw 65-2 of the liquid crystal module holder 36 with a corresponding hole 61-2 formed at an end portion of the longitudinal surface of the holder connection portion 41b (see FIG. 16B).

Accordingly, as shown in FIGS. 15 to 16C, the frame 41 is curved such that its central portion protrudes due to a repulsive force (compressibility) of the dustproof gasket 39 for supporting the LCD protection panel 33 from below the LCD protection panel 33, from the lower surface of the LCD protection panel 33. Thus, the LCD protection panel 33 partially covered with the liquid crystal display protection panel contact portion 41a of the frame 41 is curved such that its central portion protrudes.

Hence, enough clearance is secured between the lower surface of the LCD protection panel 33 and the upper surface of the LCD module 38. Thus, the lower surface of the LCD protection panel 33 can be kept from contact (interfering) with the upper surface of the LCD module 38.

Since the LCD protection panel 33 is previously curved such that its central portion upwardly protrudes, the LCD protection panel 33 could warp upwardly (to the left in FIG. 15) due to expansion but does not warp downwardly (to the right in FIG. 15). That is, the LCD protection panel 33 can warp upwardly only (in a direction of increasing a distance from the upper surface of the LCD module 38). Thus, the lower surface of the LCD protection panel 33 can be kept from contact (interfering) with the upper surface of the LCD module 38.

As described above, with this structure as well, the lower surface of the LCD protection panel 33 can be kept from contact (interfering) with the upper surface of the liquid crystal module 38. Thus, it is possible to avoid a phenomenon that looks as if a droplet infiltrates in between the LCD protection panel 33 and the liquid crystal module 38 can be avoided without increasing the gap between the lower surface of the LCD protection panel 33 and the upper surface of the liquid crystal module 38.

The embodiments are described in detail above. However, the present invention is not limited to the above embodiments but could be modified and changed without departing from the scope of the invention.

For example, the above embodiments describe the liquid crystal display device in the cell phone for illustrative purposes, but the embodiments are also applicable to a liquid crystal display device in other electronic devices such as a portable information terminal such as a PDA (personal digital assistants), a portable PC (personal computer) such as a laptop PC, a desktop PC, and a television.

What is claimed is:

1. A liquid crystal display device comprising:
   a liquid crystal display panel having a display surface and a periphery outside the display surface;
   a liquid crystal display protection panel having first and second opposite surface with the first surface being over the liquid crystal display panel so as to protect the display surface,
   wherein a central area of the liquid crystal display protection panel protrudes away from the liquid crystal display panel;
   an elastic member between a peripheral portion of the first surface of the liquid crystal display protection panel and the periphery of the liquid crystal display panel;
   a holder for holding the liquid crystal display panel; and
   a frame having a first portion contacting the second surface of the liquid crystal display protection panel, and a second portion for connecting to the holder with the liquid crystal display panel, elastic member and the liquid crystal display protection panel therebetween,
   wherein a central area of the frame protrudes away from the liquid crystal display panel to correspond to and receive the central area of the liquid crystal display protection panel.

2. The liquid crystal display device according to claim 1, wherein the first portion of the frame supports a peripheral portion on a second surface of the liquid crystal display protection panel, and the second portion of the frame protrudes to include a surface inclining from the central portion to the first portion so as to complementarily receive the liquid crystal display protection panel.

3. The liquid crystal display device according to claim 1, wherein the elastic member compresses to receive the protruding central area of the liquid crystal display protection panel.

4. The liquid crystal display device according to claim 1, wherein the holder has one of a hole and a claw, and the second portion of the frame has the other of the hole and the claw, wherein the claw and the hole engage to connect the frame and the holder.

5. The liquid crystal display device according to claim 1, wherein the liquid crystal display device is a portable information terminal.

\* \* \* \* \*

UNITED STATES PATENT AND TRADEMARK OFFICE
CERTIFICATE OF CORRECTION

| | | |
|---|---|---|
| PATENT NO. | : 8,648,980 B2 | Page 1 of 1 |
| APPLICATION NO. | : 13/373400 | |
| DATED | : February 11, 2014 | |
| INVENTOR(S) | : Yada et al. | |

It is certified that error appears in the above-identified patent and that said Letters Patent is hereby corrected as shown below:

In the Specification

Column 1, Line 11, Delete "2007,the" and insert -- 2007, the --, therefor.

In the Claims

Column 10, Line 2, In Claim 1, Delete "opposite surface" and insert -- opposite surfaces --, therefor.

Signed and Sealed this
Twenty-seventh Day of May, 2014

Michelle K. Lee
*Deputy Director of the United States Patent and Trademark Office*